United States Patent
Bai et al.

(10) Patent No.: US 12,043,742 B2
(45) Date of Patent: Jul. 23, 2024

(54) OIL-SOLUBLE THERMOSENSITIVE RESIN LOST CIRCULATION MATERIAL FOR PROTECTING A RESERVOIR AS WELL AS PREPARATION METHOD AND APPLICATION THEREOF

(71) Applicant: CHINA UNIVERSITY OF PETROLEUM (EAST CHINA), Qingdao (CN)

(72) Inventors: Yingrui Bai, Qingdao (CN); Jinsheng Sun, Qingdao (CN); Kaihe Lv, Qingdao (CN); Guancheng Jiang, Qingdao (CN); Rongchao Cheng, Qingdao (CN); Weian Huang, Qingdao (CN); Jintang Wang, Qingdao (CN); Jingping Liu, Qingdao (CN); Xianbin Huang, Qingdao (CN); Jiafeng Jin, Qingdao (CN); Jian Li, Qingdao (CN); Shenglong Shi, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 35 days.

(21) Appl. No.: 17/822,764

(22) Filed: Aug. 26, 2022

(65) Prior Publication Data
US 2023/0086238 A1  Mar. 23, 2023

(30) Foreign Application Priority Data
Sep. 8, 2021 (CN) .......................... 202111047611.8

(51) Int. Cl.
  *C08L 93/04*  (2006.01)

(52) U.S. Cl.
  CPC ......... *C08L 93/04* (2013.01); *C08L 2205/03* (2013.01)

(58) Field of Classification Search
  CPC .............................. C08L 93/04; C08L 2205/03
  See application file for complete search history.

(56) References Cited

FOREIGN PATENT DOCUMENTS

CN    111961344 A  * 11/2020  ............. C08L 83/04

OTHER PUBLICATIONS

Hyperlink to English translation: https://worldwide.espacenet.com/publicationDetails/biblio?CC=CN&NR=111961344A&KC=A&FT=D&ND=3&date=20201120&DB=EPODOC&locale=en_EP, Accessed: Dec. 29, 2023 (Year: 2020).*

* cited by examiner

*Primary Examiner* — Ling Siu Choi
*Assistant Examiner* — Andrea Wu
(74) *Attorney, Agent, or Firm* — CBM PATENT CONSULTING, LLC

(57) ABSTRACT

An oil-soluble thermosensitive resin lost circulation material for protecting a reservoir includes the following raw materials in parts by weight: 40-60 parts of resin matrix, 15-40 parts of modified asphalt, 5-12 parts of viscosity modifier, 2-5 parts of cross-linking agent, 6-15 parts of softening point modifier, and 1-3 parts of dispersant; it further provides a method for preparing the resin lost circulation material; the resin lost circulation material can melt and adhere in different temperature ranges, rapid plugging is realized, and the plugging time is long; the oil-soluble thermosensitive resin lost circulation material can be dissolved by oil flow during oil well production, so that the reservoir permeability is recovered, so as to achieve the purpose of protecting the hydrocarbon reservoir.

7 Claims, No Drawings

OIL-SOLUBLE THERMOSENSITIVE RESIN LOST CIRCULATION MATERIAL FOR PROTECTING A RESERVOIR AS WELL AS PREPARATION METHOD AND APPLICATION THEREOF

CROSS REFERENCES

This application claims priority to Chinese Patent Application Ser. No. CN2021110476118 filed on 8 Sep. 2021.

TECHNICAL FIELD

The present invention relates to an oil-soluble thermosensitive resin lost circulation material for protecting a reservoir as well as a preparation method and an application thereof, and belongs to the technical field of drilling fluid plugging in oil exploration and development.

BACKGROUND ART

In order to ensure safe, rapid and efficient drilling process, the bottom hole pressure must be maintained above the formation pressure, but this differential pressure will lead to leakage of drilling fluid when there are permeable or fractured formations. A large amount of drilling fluid is lost due to lost circulation, which increases the drilling cost. Moreover, the lost drilling fluid will destroy the reservoir permeability and reduce the oil and gas recovery efficiency after entering the formation. Such problems are those we must face in oil and gas exploitation.

At present, although a large number of different lost circulation materials and various plugging measures have been developed, conventional plugging materials exhibit relatively weak performance when large fractures and caves are encountered during drilling. For example, the walnut shell and mica are difficult to play a role of plugging fractures in the leakage area because of insufficient temperature resistance and pressure bearing, and difficult to play a role of plugging retention in the leakage area because of insufficient ability to cement with the formation, and tend to cause secondary leakage and other problems. Gel lost circulation materials can adapt to pore size, but have the problems of poor temperature and salt resistance and low mechanical strength which need to be solved by researchers.

In the common lost circulation materials, the oil-soluble thermosensitive resin lost circulation material has been highly valued in recent years for its advantages, and become one of the key research directions. In construction, the oil-soluble thermosensitive resin lost circulation material can adapt to different formation temperatures, change from particles to a molten state, and achieve rapid fracture plugging with a long plugging time. Upon completion of the construction, the oil-soluble resin lost circulation material can be dissolved into crude oil and discharged with the crude oil, so that the reservoir permeability recovers and the hydrocarbon reservoir is effectively protected. For example, Chinese Patent Application CN104388068A provides a high-temperature oil-soluble temporary lost circulation material and a preparation method thereof. The temporary lost circulation material is composed of the following raw materials in percentage by weight: 10-40% of asphalt, 20-50% of C9 petroleum resin, 15-50% of coumarone resin, 5-15% of surfactant, 2-15% of polymer fiber and 1-10% of softening point additive. But that oil-soluble temporary lost circulation material fails to protect the hydrocarbon reservoir well due to relatively low oil soluble rate and relatively poor oil solubility at high temperature. Chinese Patent Application CN111793485A provides a water shutoff agent, composed of the following raw materials in percentage by weight: 65-90% of oil-soluble resin, 2-5% of industrial gelatin, 3-25% of plasticizer, 2-4% of softening point modifier, 0.5-1.0% of cross-linking agent and 0.3% of dispersant. But that water shutoff agent has poor high temperature resistance and short plugging time.

At present, the oil-soluble lost circulation materials have the general deficiencies of low plugging strength, narrow adaptive temperature range and poor oil solubility, so they cannot be used in different formations. Therefore, it is urgent to develop a resin lost circulation material for protecting a reservoir with high plugging strength, controllable adaptive temperature range and strong oil solubility.

SUMMARY

In order to overcome the deficiencies in the prior art, the present invention provides an oil-soluble thermosensitive resin lost circulation material for protecting a reservoir as well as a preparation method and an application thereof. The oil-soluble thermosensitive resin lost circulation material can melt and adhere in different temperature ranges, rapid plugging is realized, and the plugging time is long. The oil-soluble thermosensitive resin lost circulation material can be dissolved by oil flow during oil well production because of the characteristic that the oil-soluble resin is oil-soluble, so that the reservoir permeability is recovered, so as to achieve the purpose of protecting the hydrocarbon reservoir. The resin lost circulation material of the present invention has the advantages of thermosensitivity, reservoir protection, strong stability and long plugging time, and can fully and smoothly enter the formation fracture and achieve the purpose of effectively plugging the fracture pores.

The technical solutions of the present invention are as follows:

An oil-soluble thermosensitive resin lost circulation material for protecting a reservoir includes the following raw materials in parts by weight: 40-60 parts of resin matrix, 15-40 parts of modified asphalt, 5-12 parts of viscosity modifier, 2-5 parts of cross-linking agent, 6-15 parts of softening point modifier, and 1-3 parts of dispersant.

According to the prevent invention, preferably, the oil-soluble thermosensitive resin lost circulation material for protecting a reservoir includes the following raw materials in parts by weight: 44-56 parts of resin matrix, 25-35 parts of modified asphalt, 7-10 parts of viscosity modifier, 2-4 parts of cross-linking agent, 9-12 parts of softening point modifier, and 1-2 parts of dispersant.

According to the prevent invention, preferably, the resin matrix is a combination of two or three of oil-soluble phenolic resin, rosin resin and acrylic resin;

further preferably, the resin matrix is a combination of oil-soluble phenolic resin and rosin resin, wherein a mass ratio of the oil-soluble phenolic resin to the rosin resin is 1:2.

According to the prevent invention, the oil-soluble phenolic resin is para-tertiary butylphenol resin, with a number-average molecular weight of 500-1,000, a density of 1.05 g/cm$^3$ and a softening point of 100-140° C.

According to the prevent invention, the rosin resin is hydrogenated rosin (amorphous transparent solid resin), containing 75% of dihydrogenated rosin, with a density of 1.045 g/cm$^3$ and a softening point of 70-72° C.

According to the prevent invention, the acrylic resin is thermosetting acrylic resin, with a number-average molecular weight of 10,000-20,000.

According to the prevent invention, preferably, the viscosity modifier is a combination of two or three of paraffin, N,N'-ethylene bisstearamide and oxidized polyethylene wax; the viscosity modifier can reduce the viscosity of polymers and increase the fluidity;

further preferably, the viscosity modifier is a combination of N,N'-ethylene bisstearamide and oxidized polyethylene wax, wherein a mass ratio of the N,N'-ethylene bisstearamide to the oxidized polyethylene wax is 1:2.

Further preferably, a number-average molecular weight of the oxidized polyethylene wax is 1,000-10,000, a melting point is 88-133° C., and an acid value is 0.5-40 mg KOH/g.

According to the prevent invention, preferably, the softening point modifier is a combination of two or more of dihydrogenated rosin, tetrahydrogenated rosin, dimethyl phthalate and dioctyl phthalate;

further preferably, the softening point modifier is a combination of dihydrogenated rosin and tetrahydrogenated rosin, wherein a mass ratio of the dihydrogenated rosin to the tetrahydrogenated rosin is 1:1.

According to the prevent invention, the dihydrogenated rosin refers to rosin partially saturated with hydrogen, with a structural formula of $C_{19}H_{31}COOH$ and a molecular weight of 304.46; the tetrahydrogenated rosin refers to rosin saturated with hydrogen, with a structural formula of $C_{19}H_{33}COOH$ and a molecular weight of 306.47.

According to the prevent invention, preferably, the cross-linking agent is one or a combination of two or three of epoxy resin, terephthalyl alcohol and C9 petroleum resin; the cross-linking agent can generate chemical bonds between linear molecules and connects the linear molecules to form a net structure, so that the strength and elasticity of high polymer materials are improved, and the heat resistance, adhesion and mechanical strength of the product are improved.

According to the present invention, the epoxy resin is bisphenol A epoxy resin (a high-molecular compound prepared by condensation of bisphenol A and epichlorohydrin under alkaline conditions, water washing, desolventization and refining), i.e., thermoplastic resin, having thermosetting property, with a number-average molecular weight of 3,100-7,000 and a density of 1.16 $g/cm^3$.

According to the present invention, a density of the C9 petroleum resin is 1.02-1.12 $g/cm^3$, a number-average molecular weight is 300-3,000, a softening point is 90-140° C., and a melt viscosity is 400-800 mPa·s.

According to the prevent invention, preferably, the dispersant is one or a combination of two or three of sodium dodecyl sulfonate, 1-Octadecanol and tris-ethylhexyl phosphate; the dispersant can disperse the resin matrix evenly.

According to the prevent invention, the tris-ethylhexyl phosphate includes a structural formula as follows:

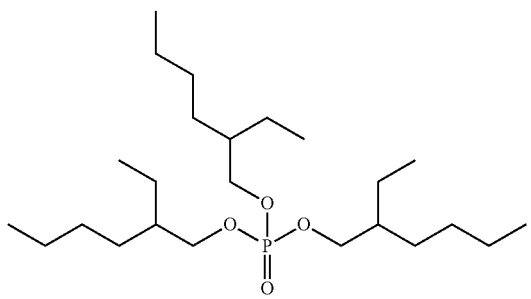 [SMILES: CCCCC(CC)COP(=O)(OCC(CC)CCCC)OCC(CC)CCCC]

According to the prevent invention, preferably, the modified asphalt is prepared according to the following method:
(i) adding asphalt to a reactor, and setting a reactor temperature to 80-120° C.;
(ii) adding C9 petroleum resin and terephthalyl alcohol to the reactor, introducing nitrogen at a normal pressure, and stirring the mixture fully for reaction; and
(iii) then further heating the mixture to 100-140° C., and stirring the mixture fully for reaction; upon completion of the reaction, drying, crushing and screening the obtained product to obtain modified asphalt.

Preferably, in step (i), the reactor temperature is set to 90-100° C.; a softening point of the asphalt is 50-60° C., and a density is 1.15-1.25 $g/cm^3$.

Preferably, in step (ii), a mass ratio of the C9 petroleum resin to the terephthalyl alcohol is 1:(1-2); a mass ratio of the C9 petroleum resin to the asphalt is 1:(2-4); a stirring speed is 100-300 rpm; and a reaction time is 2-3 h.

Preferably, in step (iii), the heating is heating to 110-120° C.; a stirring speed is 100-200 rpm; a reaction time is 1-2 h; and the drying is drying at 30-40° C. for 0.5-2 h.

In order to overcome the deficiencies of the resin matrix properties, enable the resin to have high oil solubility and regulate the softening point of the resin, modified asphalt with a molecular structure close to oil is added to the resin in the present invention, and the ratio of the modified asphalt to the resin matrix is optimized to regulate the properties of the resin lost circulation material, so that the resin lost circulation material can be fully dissolved in crude oil. The softening point of asphalt should be adjustable in order to meet the requirement of actual formation internal temperature. In the present invention, the asphalt is modified by adding the cross-linking agent of C9 petroleum resin and terephthalyl alcohol to the asphalt, so as to improve the softening point of the asphalt.

According to the present invention, a method for preparing the oil-soluble thermosensitive resin lost circulation material for protecting a reservoir includes the following steps:
(1) heating resin matrix until it is melted completely, and adding dispersant under stirring to obtain a mixture I;
(2) adding viscosity modifier to the mixture I obtained in step (1), controlling a mixing temperature at 130-150° C., and stirring the mixture evenly; adding cross-linking agent under stirring for reaction; then adding softening point modifier, and stirring the mixture evenly to obtain a mixture II; then cooling and crushing the mixture II to obtain resin particles; and
(3) grinding, mixing and screening the modified asphalt and the resin particles to obtain the oil-soluble thermosensitive resin lost circulation material for protecting a reservoir with different particle sizes.

According to the prevent invention, preferably, in step (1), the heating is heating to 120-160° C., and more preferably 130-145° C.

According to the prevent invention, preferably, in step (2), a temperature of the mixing is 140-150° C.; a speed of the stirring is 200-500 rpm, and further adjusted according to the actual situation; and a reaction time is 30-60 min after the cross-linking agent is added.

According to the prevent invention, preferably, in step (2), the cooling is cooling to a room temperature; the crushing can be performed by a high-speed universal grinder, and a median particle diameter of the crushed particles can be controlled by setting the crushing time after a speed is adjusted; preferably, the speed of the high-speed universal grinder is 15,000-24,000 rpm, and more preferably 18,000-22,000 rpm; and a crushing time is 2-10 min, and more preferably 3-5 min.

According to the prevent invention, preferably, in step (3), the grinding is performed by a colloid mill, and a rotation speed of a colloid mill rotor is 5,000-10,000 rpm, and more preferably 6,000-8,000 rpm.

According to the present invention, an application of the oil-soluble thermosensitive resin lost circulation material for protecting a reservoir in oil and gas drilling is provided.

The present invention has the following technical features and beneficial effects:
1. The oil-soluble thermosensitive resin lost circulation material for protecting a reservoir of the present invention can change with formation temperature. After being injected into the formation, the resin lost circulation material gradually turns into a molten-state lost circulation material with strong adhesion and elastic characteristics after reaching the melting point and thus forms a plugging layer with elasticity and adhesion, realizing effective plugging of the leakage channel, and preventing repeated leakage of the formation with high pressure bearing.
2. The oil-soluble thermosensitive resin lost circulation material for protecting a reservoir of the present invention widens the softening point temperature range of the resin matrix. The applicable formation temperature range is 100-180° C., which can be adjusted for the formations with different temperatures.
3. The oil-soluble thermosensitive resin lost circulation material for protecting a reservoir of the present invention has a high bearing strength. The bearing capacity for holes and fractures may be up to 7-8 MPa, so that the leakage layer can be plugged rapidly in a short time, and the plugging time can be maintained for 3-4 h. The plugging effect is excellent.
4. The oil-soluble thermosensitive resin lost circulation material for protecting a reservoir of the present invention has the characteristic of being dissolved in oil, and thus the oil-soluble resin will be dissolved by oil flow during oil well production, so that the reservoir permeability is recovered to more than 87%, so as to achieve the purpose of protecting the hydrocarbon reservoir. Moreover, the cost is saved as no additional plugging removal operation is required for the lost circulation material.
5. The oil-soluble thermosensitive resin lost circulation material for protecting a reservoir of the present invention is simple in preparation process, little in impact on the properties of drilling fluid, and convenient for production and field operation.

DETAILED DESCRIPTION OF THE EMBODIMENTS

The present invention will be further described below in combination with specific embodiments, but not limited to these embodiments.

The raw materials used in the embodiments are conventional raw materials, and are commercially available; the methods are prior art, unless otherwise specified.

The oil-soluble phenolic resin used in the embodiments is the product from Guangzhou Ganyiyuan Synthetic Material Technology Co., Ltd., with a softening point of 100-140° C., an average molecular weight of 500-1,000, a density of 1.05 g/cm$^3$ and a designation of 2402.

The rosin resin is the product from Jining Sanshi Biotechnology Co., Ltd., with a softening point of 70-72° C. and a density of 1.045 g/cm$^3$.

The oxidized polyethylene wax is the product from Shandong Xie Heng Plastic Auxiliaries Co., Ltd., with a number-average molecular weight of 4,000, a melting point of 104° C. and an acid value of 0.97 mg KOH/g.

The epoxy resin is the product from Wuxi Changgan Chemical Co., Ltd., with a number-average molecular weight of 5,000 and a density of 1.16 g/cm$^3$.

The C9 petroleum resin is the product from Puyang Hengfeng Petroleum Chemical Co., Ltd., with a number-average molecular weight of 300-3,000, a softening point of 90-140° C., a melt viscosity of 400-800 mPa's and a density of 1.02-1.12 g/cm$^3$.

The asphalt is the product from Tianjin Chemical Reagent Factory, with a softening point of 50-60° C. and a density of 1.20 g/cm$^3$.

Example 1

An oil-soluble thermosensitive resin lost circulation material for protecting a reservoir included the following raw materials in parts by weight: 51 parts of resin matrix, 27 parts of modified asphalt, 8 parts of viscosity modifier, 2.5 parts of cross-linking agent, 10 parts of softening point modifier, and 1.5 parts of dispersant.

Wherein the resin matrix was a combination of oil-soluble phenolic resin and rosin resin, and a mass ratio of the oil-soluble phenolic resin to the rosin resin was 1:2; the viscosity modifier was a combination of N,N'-ethylene bisstearamide and oxidized polyethylene wax, and a mass ratio of the N,N'-ethylene bisstearamide to the oxidized polyethylene wax was 1:2; the softening point modifier was a combination of dihydrogenated rosin and tetrahydrogenated rosin, and a mass ratio of the dihydrogenated rosin to the tetrahydrogenated rosin was 1:1; the cross-linking agent was epoxy resin; and the dispersant was sodium dodecyl sulfonate.

The modified asphalt was prepared according to the following method:
(i) asphalt was added to a reactor, and a reactor temperature was set to 90° C.;
(ii) C9 petroleum resin and terephthalyl alcohol (a mass ratio of the C9 petroleum resin to the terephthalyl alcohol was 1:1.5) were added to the reactor, and nitrogen was introduced at a normal pressure, and the mixture was stirred fully at 200 rpm and reacted for 2 h; wherein a mass ratio of the C9 petroleum resin to the asphalt was 1:3; and
(iii) then the mixture was further heated to 110° C., stirred fully at 150 rpm and reacted for 1.5 h; the obtained product was dried at 40° C. for 2 h, crushed and screened.

A method for preparing the oil-soluble thermosensitive resin lost circulation material for protecting a reservoir included the following steps:
(1) resin matrix was heated to and controlled at 130° C., stirred until it was melted completely, and dispersant was added under stirring to obtain a mixture I;
(2) viscosity modifier was added to the mixture I obtained in step (1), a mixing temperature was controlled at 140° C., the mixture was stirred evenly at 250 rpm; then cross-linking agent was added at 250 rpm, the mixture was stirred at 140° C. and reacted for 40 min; then softening point modifier was added, the mixture was stirred evenly until the softening point modifier was dissolved completely to obtain a mixture II; the mixture II was cooled to a room temperature by a central water cooling method, then placed in a high-speed universal grinder, and ground at 18,000 rpm for 3 min to obtain resin particles; and (3) the modified asphalt and the resin particles were placed in a colloid mill, ground and mixed, wherein a rotation speed of a colloid mill rotor was 6,000 rpm, and then the mixture was screened by 40-mesh, 60-mesh, 80-mesh and 100-mesh sieves respectively to obtain the oil-soluble thermosensitive resin lost circulation material for protecting a reservoir with different particle sizes.

Example 2

An oil-soluble thermosensitive resin lost circulation material for protecting a reservoir included the following raw materials in parts by weight: 53 parts of resin matrix, 27 parts of modified asphalt, 8 parts of viscosity modifier, 2.5 parts of cross-linking agent, 8 parts of softening point modifier, and 1.5 parts of dispersant.

Wherein the resin matrix was a combination of oil-soluble phenolic resin and rosin resin, and a mass ratio of the oil-soluble phenolic resin to the rosin resin was 1:2; the viscosity modifier was a combination of N,N'-ethylene bisstearamide and oxidized polyethylene wax, and a mass ratio of the N,N'-ethylene bisstearamide to the oxidized polyethylene wax was 1:2; the softening point modifier was a combination of dihydrogenated rosin and tetrahydrogenated rosin, and a mass ratio of the dihydrogenated rosin to the tetrahydrogenated rosin was 1:1; the cross-linking agent was epoxy resin; and the dispersant was sodium dodecyl sulfonate.

A method for preparing the modified asphalt is as described in example 1.

A method for preparing the oil-soluble thermosensitive resin lost circulation material for protecting a reservoir is as described in example 1.

Example 3

An oil-soluble thermosensitive resin lost circulation material for protecting a reservoir included the following raw materials in parts by weight: 53 parts of resin matrix, 27 parts of modified asphalt, 6 parts of viscosity modifier, 2.5 parts of cross-linking agent, 10 parts of softening point modifier, and 1.5 parts of dispersant.

Wherein the resin matrix was a combination of oil-soluble phenolic resin and rosin resin, and a mass ratio of the oil-soluble phenolic resin to the rosin resin was 1:2; the viscosity modifier was a combination of N,N'-ethylene bisstearamide and oxidized polyethylene wax, and a mass ratio of the N,N'-ethylene bisstearamide to the oxidized polyethylene wax was 1:2; the softening point modifier was a combination of dihydrogenated rosin and tetrahydrogenated rosin, and a mass ratio of the dihydrogenated rosin to the tetrahydrogenated rosin was 1:1; the cross-linking agent was epoxy resin; and the dispersant was sodium dodecyl sulfonate.

A method for preparing the modified asphalt is as described in example 1.

A method for preparing the oil-soluble thermosensitive resin lost circulation material for protecting a reservoir is as described in example 1.

Example 4

An oil-soluble thermosensitive resin lost circulation material for protecting a reservoir included the following raw materials in parts by weight: 55 parts of resin matrix, 23 parts of modified asphalt, 8 parts of viscosity modifier, 2.5 parts of cross-linking agent, 10 parts of softening point modifier, and 1.5 parts of dispersant.

Wherein the resin matrix was a combination of oil-soluble phenolic resin and rosin resin, and a mass ratio of the oil-soluble phenolic resin to the rosin resin was 1:2; the viscosity modifier was a combination of N,N'-ethylene bisstearamide and oxidized polyethylene wax, and a mass ratio of the N,N'-ethylene bisstearamide to the oxidized polyethylene wax was 1:2; the softening point modifier was a combination of dihydrogenated rosin and tetrahydrogenated rosin, and a mass ratio of the dihydrogenated rosin to the tetrahydrogenated rosin was 1:1; the cross-linking agent was epoxy resin; and the dispersant was sodium dodecyl sulfonate.

A method for preparing the modified asphalt is as described in example 1.

A method for preparing the oil-soluble thermosensitive resin lost circulation material for protecting a reservoir is as described in example 1.

Example 5

An oil-soluble thermosensitive resin lost circulation material for protecting a reservoir included the following raw materials in parts by weight: 55 parts of resin matrix, 27 parts of modified asphalt, 6 parts of viscosity modifier, 2.5 parts of cross-linking agent, 8 parts of softening point modifier, and 1.5 parts of dispersant.

Wherein the resin matrix was a combination of oil-soluble phenolic resin and rosin resin, and a mass ratio of the oil-soluble phenolic resin to the rosin resin was 1:2; the viscosity modifier was a combination of N,N'-ethylene bisstearamide and oxidized polyethylene wax, and a mass ratio of the N,N'-ethylene bisstearamide to the oxidized polyethylene wax was 1:2; the softening point modifier was a combination of dihydrogenated rosin and tetrahydrogenated rosin, and a mass ratio of the dihydrogenated rosin to the tetrahydrogenated rosin was 1:1; the cross-linking agent was epoxy resin; and the dispersant was sodium dodecyl sulfonate.

A method for preparing the modified asphalt is as described in example 1.

A method for preparing the oil-soluble thermosensitive resin lost circulation material for protecting a reservoir is as described in example 1.

Example 6

An oil-soluble thermosensitive resin lost circulation material for protecting a reservoir included the following raw materials in parts by weight: 57 parts of resin matrix, 23 parts of modified asphalt, 8 parts of viscosity modifier, 2.5 parts of cross-linking agent, 8 parts of softening point modifier, and 1.5 parts of dispersant.

Wherein the resin matrix was a combination of oil-soluble phenolic resin and rosin resin, and a mass ratio of the oil-soluble phenolic resin to the rosin resin was 1:2; the viscosity modifier was a combination of N,N'-ethylene bisstearamide and oxidized polyethylene wax, and a mass ratio of the N,N'-ethylene bisstearamide to the oxidized polyethylene wax was 1:2; the softening point modifier was a combination of dihydrogenated rosin and tetrahydrogenated rosin, and a mass ratio of the dihydrogenated rosin to the tetrahydrogenated rosin was 1:1; the cross-linking agent was epoxy resin; and the dispersant was sodium dodecyl sulfonate.

A method for preparing the modified asphalt is as described in example 1.

A method for preparing the oil-soluble thermosensitive resin lost circulation material for protecting a reservoir is as described in example 1.

Example 7

An oil-soluble thermosensitive resin lost circulation material for protecting a reservoir included the following raw materials in parts by weight: 57 parts of resin matrix, 17 parts of modified asphalt, 12 parts of viscosity modifier, 2.5 parts of cross-linking agent, 10 parts of softening point modifier, and 1.5 parts of dispersant.

Wherein the resin matrix was a combination of oil-soluble phenolic resin and rosin resin, and a mass ratio of the oil-soluble phenolic resin to the rosin resin was 1:2; the viscosity modifier was a combination of N,N'-ethylene bis-stearamide and oxidized polyethylene wax, and a mass ratio of the N,N'-ethylene bisstearamide to the oxidized polyethylene wax was 1:2; the softening point modifier was a combination of dihydrogenated rosin and tetrahydrogenated rosin, and a mass ratio of the dihydrogenated rosin to the tetrahydrogenated rosin was 1:1; the cross-linking agent was epoxy resin; and the dispersant was sodium dodecyl sulfonate.

A method for preparing the modified asphalt is as described in example 1.

A method for preparing the oil-soluble thermosensitive resin lost circulation material for protecting a reservoir is as described in example 1.

Example 8

An oil-soluble thermosensitive resin lost circulation material for protecting a reservoir included the following raw materials in parts by weight: 59 parts of resin matrix, 23 parts of modified asphalt, 6 parts of viscosity modifier, 2.5 parts of cross-linking agent, 8 parts of softening point modifier, and 1.5 parts of dispersant.

Wherein the resin matrix was a combination of oil-soluble phenolic resin and rosin resin, and a mass ratio of the oil-soluble phenolic resin to the rosin resin was 1:2; the viscosity modifier was a combination of N,N'-ethylene bis-stearamide and oxidized polyethylene wax, and a mass ratio of the N,N'-ethylene bisstearamide to the oxidized polyethylene wax was 1:2; the softening point modifier was a combination of dihydrogenated rosin and tetrahydrogenated rosin, and a mass ratio of the dihydrogenated rosin to the tetrahydrogenated rosin was 1:1; the cross-linking agent was epoxy resin; and the dispersant was sodium dodecyl sulfonate.

A method for preparing the modified asphalt is as described in example 1.

A method for preparing the oil-soluble thermosensitive resin lost circulation material for protecting a reservoir is as described in example 1.

Example 9

An oil-soluble thermosensitive resin lost circulation material for protecting a reservoir included the following raw materials in parts by weight: 55 parts of resin matrix, 27 parts of modified asphalt, 6 parts of viscosity modifier, 2.5 parts of cross-linking agent, 8 parts of softening point modifier, and 1.5 parts of dispersant.

Wherein the resin matrix was a combination of oil-soluble phenolic resin and rosin resin, and a mass ratio of the oil-soluble phenolic resin to the rosin resin was 1:2; the viscosity modifier was a combination of N,N'-ethylene bis-stearamide and oxidized polyethylene wax, and a mass ratio of the N,N'-ethylene bisstearamide to the oxidized polyethylene wax was 1:2; the softening point modifier was a combination of dihydrogenated rosin and tetrahydrogenated rosin, and a mass ratio of the dihydrogenated rosin to the tetrahydrogenated rosin was 1:1; the cross-linking agent was C9 petroleum resin; and the dispersant was sodium dodecyl sulfonate.

A method for preparing the modified asphalt is as described in example 1.

A method for preparing the oil-soluble thermosensitive resin lost circulation material for protecting a reservoir is as described in example 1.

Example 10

An oil-soluble thermosensitive resin lost circulation material for protecting a reservoir included the following raw materials in parts by weight: 57 parts of resin matrix, 23 parts of modified asphalt, 8 parts of viscosity modifier, 2.5 parts of cross-linking agent, 8 parts of softening point modifier, and 1.5 parts of dispersant.

Wherein the resin matrix was a combination of oil-soluble phenolic resin and rosin resin, and a mass ratio of the oil-soluble phenolic resin to the rosin resin was 1:2; the viscosity modifier was a combination of N,N'-ethylene bis-stearamide and oxidized polyethylene wax, and a mass ratio of the N,N'-ethylene bisstearamide to the oxidized polyethylene wax was 1:2; the softening point modifier was a combination of dihydrogenated rosin and tetrahydrogenated rosin, and a mass ratio of the dihydrogenated rosin to the tetrahydrogenated rosin was 1:1; the cross-linking agent was epoxy resin; and the dispersant was tris-ethylhexyl phosphate.

A method for preparing the modified asphalt is as described in example 1.

A method for preparing the oil-soluble thermosensitive resin lost circulation material for protecting a reservoir is as described in example 1.

Example 11

An oil-soluble thermosensitive resin lost circulation material for protecting a reservoir included the following raw materials in parts by weight: 57 parts of resin matrix, 23 parts of modified asphalt, 6 parts of viscosity modifier, 2.5 parts of cross-linking agent, 10 parts of softening point modifier, and 1.5 parts of dispersant.

Wherein the resin matrix was a combination of oil-soluble phenolic resin and rosin resin, and a mass ratio of the oil-soluble phenolic resin to the rosin resin was 1:2; the viscosity modifier was a combination of N,N'-ethylene bis-stearamide and oxidized polyethylene wax, and a mass ratio of the N,N'-ethylene bisstearamide to the oxidized polyethylene wax was 1:2; the softening point modifier was dihydrogenated rosin; the cross-linking agent was epoxy resin; and the dispersant was sodium dodecyl sulfonate.

A method for preparing the modified asphalt is as described in example 1.

A method for preparing the oil-soluble thermosensitive resin lost circulation material for protecting a reservoir is as described in example 1.

Example 12

An oil-soluble thermosensitive resin lost circulation material for protecting a reservoir included the following raw materials in parts by weight: 59 parts of resin matrix, 23 parts of modified asphalt, 6 parts of viscosity modifier, 2.5 parts of cross-linking agent, 8 parts of softening point modifier, and 1.5 parts of dispersant.

Wherein the resin matrix was a combination of oil-soluble phenolic resin and rosin resin, and a mass ratio of the oil-soluble phenolic resin to the rosin resin was 1:2; the viscosity modifier was paraffin; the softening point modifier was a combination of dihydrogenated rosin and tetrahydrogenated rosin, and a mass ratio of the dihydrogenated rosin to the tetrahydrogenated rosin was 1:1; the cross-linking agent was epoxy resin; and the dispersant was sodium dodecyl sulfonate.

A method for preparing the modified asphalt is as described in example 1.

A method for preparing the oil-soluble thermosensitive resin lost circulation material for protecting a reservoir is as described in example 1.

Example 13

An oil-soluble thermosensitive resin lost circulation material for protecting a reservoir included the following raw materials in parts by weight: 42 parts of resin matrix, 32 parts of modified asphalt, 9 parts of viscosity modifier, 3 parts of cross-linking agent, 12 parts of softening point modifier, and 2 parts of dispersant.

Wherein the resin matrix was a combination of oil-soluble phenolic resin and rosin resin, and a mass ratio of the oil-soluble phenolic resin to the rosin resin was 1:2; the viscosity modifier was paraffin; the softening point modifier was a combination of dihydrogenated rosin and tetrahydrogenated rosin, and a mass ratio of the dihydrogenated rosin to the tetrahydrogenated rosin was 1:1; the cross-linking agent was epoxy resin; and the dispersant was sodium dodecyl sulfonate.

A method for preparing the modified asphalt is as described in example 1.

A method for preparing the oil-soluble thermosensitive resin lost circulation material for protecting a reservoir is as described in example 1.

Example 14

An oil-soluble thermosensitive resin lost circulation material for protecting a reservoir included the following raw materials in parts by weight: 45 parts of resin matrix, 38 parts of modified asphalt, 5 parts of viscosity modifier, 2 parts of cross-linking agent, 8 parts of softening point modifier, and 2 parts of dispersant.

Wherein the resin matrix was a combination of oil-soluble phenolic resin and rosin resin, and a mass ratio of the oil-soluble phenolic resin to the rosin resin was 1:2; the viscosity modifier was paraffin; the softening point modifier was a combination of dihydrogenated rosin and tetrahydrogenated rosin, and a mass ratio of the dihydrogenated rosin to the tetrahydrogenated rosin was 1:1; the cross-linking agent was epoxy resin; and the dispersant was sodium dodecyl sulfonate.

A method for preparing the modified asphalt is as described in example 1.

A method for preparing the oil-soluble thermosensitive resin lost circulation material for protecting a reservoir is as described in example 1.

Example 15

An oil-soluble thermosensitive resin lost circulation material for protecting a reservoir included the following raw materials in parts by weight: 47 parts of resin matrix, 29 parts of modified asphalt, 8 parts of viscosity modifier, 5 parts of cross-linking agent, 9 parts of softening point modifier, and 2 parts of dispersant.

Wherein the resin matrix was a combination of oil-soluble phenolic resin and rosin resin, and a mass ratio of the oil-soluble phenolic resin to the rosin resin was 1:2; the viscosity modifier was paraffin; the softening point modifier was a combination of dihydrogenated rosin and tetrahydrogenated rosin, and a mass ratio of the dihydrogenated rosin to the tetrahydrogenated rosin was 1:1; the cross-linking agent was epoxy resin; and the dispersant was sodium dodecyl sulfonate.

A method for preparing the modified asphalt is as described in example 1.

A method for preparing the oil-soluble thermosensitive resin lost circulation material for protecting a reservoir is as described in example 1.

Example 16

An oil-soluble thermosensitive resin lost circulation material for protecting a reservoir included the following raw materials in parts by weight: 46 parts of resin matrix, 28 parts of modified asphalt, 7 parts of viscosity modifier, 2.5 parts of cross-linking agent, 15 parts of softening point modifier, and 1.5 parts of dispersant.

Wherein the resin matrix was a combination of oil-soluble phenolic resin and rosin resin, and a mass ratio of the oil-soluble phenolic resin to the rosin resin was 1:2; the viscosity modifier was paraffin; the softening point modifier was a combination of dihydrogenated rosin and tetrahydrogenated rosin, and a mass ratio of the dihydrogenated rosin to the tetrahydrogenated rosin was 1:1; the cross-linking agent was epoxy resin; and the dispersant was sodium dodecyl sulfonate.

A method for preparing the modified asphalt is as described in example 1.

A method for preparing the oil-soluble thermosensitive resin lost circulation material for protecting a reservoir is as described in example 1.

Example 17

An oil-soluble thermosensitive resin lost circulation material for protecting a reservoir included the following raw materials in parts by weight: 50 parts of resin matrix, 27 parts of modified asphalt, 8 parts of viscosity modifier, 3 parts of cross-linking agent, 11 parts of softening point modifier, and 1 part of dispersant.

Wherein the resin matrix was a combination of oil-soluble phenolic resin and rosin resin, and a mass ratio of the oil-soluble phenolic resin to the rosin resin was 1:2; the viscosity modifier was paraffin; the softening point modifier was a combination of dihydrogenated rosin and tetrahydrogenated rosin, and a mass ratio of the dihydrogenated rosin to the tetrahydrogenated rosin was 1:1; the cross-linking agent was epoxy resin; and the dispersant was sodium dodecyl sulfonate.

A method for preparing the modified asphalt is as described in example 1.

A method for preparing the oil-soluble thermosensitive resin lost circulation material for protecting a reservoir is as described in example 1.

Example 18

An oil-soluble thermosensitive resin lost circulation material for protecting a reservoir included the following raw materials in parts by weight: 49 parts of resin matrix, 26 parts of modified asphalt, 8 parts of viscosity modifier, 3 parts of cross-linking agent, 11 parts of softening point modifier, and 3 parts of dispersant.

Wherein the resin matrix was a combination of oil-soluble phenolic resin and rosin resin, and a mass ratio of the oil-soluble phenolic resin to the rosin resin was 1:2; the viscosity modifier was paraffin; the softening point modifier was a combination of dihydrogenated rosin and tetrahydrogenated rosin, and a mass ratio of the dihydrogenated rosin to the tetrahydrogenated rosin was 1:1; the cross-linking agent was epoxy resin; and the dispersant was sodium dodecyl sulfonate.

A method for preparing the modified asphalt is as described in example 1.

A method for preparing the oil-soluble thermosensitive resin lost circulation material for protecting a reservoir is as described in example 1.

Comparative Example 1

An oil-soluble thermosensitive resin lost circulation material for protecting a reservoir is as described in example 1. The difference lies in that an addition amount of the modified asphalt was 12 parts.

A method for preparing the modified asphalt is as described in example 1.

A method for preparing the resin lost circulation material is as described in example 1.

Comparative Example 2

An oil-soluble thermosensitive resin lost circulation material for protecting a reservoir is as described in example 1. The difference lies in that an addition amount of the modified asphalt was 45 parts.

A method for preparing the modified asphalt is as described in example 1.

A method for preparing the resin lost circulation material is as described in example 1.

Comparative Example 3

An oil-soluble thermosensitive resin lost circulation material for protecting a reservoir is as described in example 1. The difference lies in that an addition amount of the viscosity modifier was 4 parts.

A method for preparing the modified asphalt is as described in example 1.

A method for preparing the resin lost circulation material is as described in example 1.

Comparative Example 4

An oil-soluble thermosensitive resin lost circulation material for protecting a reservoir is as described in example 1. The difference lies in that an addition amount of the viscosity modifier was 14 parts.

A method for preparing the modified asphalt is as described in example 1.

A method for preparing the resin lost circulation material is as described in example 1.

Comparative Example 5

An oil-soluble thermosensitive resin lost circulation material for protecting a reservoir is as described in example 1. The difference lies in that an addition amount of the softening point modifier was 5 parts.

A method for preparing the modified asphalt is as described in example 1.

A method for preparing the resin lost circulation material is as described in example 1.

Comparative Example 6

An oil-soluble thermosensitive resin lost circulation material for protecting a reservoir is as described in example 1. The difference lies in that an addition amount of the softening point modifier was 18 parts.

A method for preparing the modified asphalt is as described in example 1.

A method for preparing the resin lost circulation material is as described in example 1.

Comparative Example 7

An oil-soluble thermosensitive resin lost circulation material for protecting a reservoir is as described in example 1. The difference lies in that an addition amount of the softening point modifier was 25 parts.

A method for preparing the modified asphalt is as described in example 1.

A method for preparing the resin lost circulation material is as described in example 1.

Test Example

The oil-soluble thermosensitive resin lost circulation materials for reservoir protection prepared in examples 1-18 and comparative examples 1-7 were subjected to tests of plugging performance, oil solubility and softening point.

Test 1. Test on Fracture Plugging Performance of the Oil-Soluble Thermosensitive Resin Lost Circulation Materials The specific determination method is as follows: A high-temperature and high-pressure displacement device was used to evaluate the fracture plugging capacity of the resin lost circulation materials, and different sizes of fracture modules are added. Widths of the fracture modules were 3 mm, 4 mm and 5 mm respectively, and lengths were 5 cm. The resin lost circulation materials prepared in examples 1-18 and comparative examples 1-7 were added to drilling fluid at an amount of 40 g/L, wherein the drilling fluid was 4 wt % bentonite slurry. The drilling fluid containing the resin lost circulation materials was displaced into fractures, and no drilling fluid flowed out until the fractures were completely filled with the resin lost circulation materials. The fracture modules were heated at 180° C. for 4 h and then gradually pressurized at an increase rate of 0.1 MPa per minute, and pressures of the fracture modules were observed and recorded. When the pressure exceeded the maximum bearing capacity of the resin lost circulation materials, the fluid broke through the plugging, and the pressure dropped immediately. The maximum pressure measured when the pressure started to decrease sharply was a plugging breakthrough pressure, and the plugging breakthrough pressure was used to evaluate the fracture plugging capacity of the resin lost circulation materials. The bigger the plugging breakthrough pressure, the better the plugging effect. The results are as shown in Table 1.

The above-mentioned test was repeated. The difference lies in that the plugging breakthrough pressure was measured after the fracture modules were heated and aged at 180° C. for 72 h. The results are as shown in Table 1.

lost circulation materials still had an excellent plugging effect on large fractures.

In combination with examples 1-18 and comparative examples 1-7, it can be seen that the resin lost circulation materials prepared in the examples of the present invention had an obviously better plugging performance than those prepared in comparative examples; and compared with examples 1-18, it can be seen that when the parts by weight of all the resin matrix, modified asphalt, viscosity modifier and softening point modifier were optimal, the resin lost circulation materials had the best plugging performance.

In combination with example 1 and comparative examples 1-7, it can be seen that the modified asphalt had the greatest impact on the plugging effect and the highest contribution rate, followed by the viscosity modifier and the softening point modifier; by optimizing the ratio of the modified asphalt to the resin matrix, the properties of the resin lost circulation materials were regulated; by adding the viscosity modifier, the viscosity of polymers could be reduced and the fluidity could be increased; and by adding

TABLE 1

Fracture Plugging Effect Data of Resin Lost Circulation Materials

| Sample | Plugging breakthrough pressure for 3 mm fracture/MPa | | Plugging breakthrough pressure for 4 mm fracture/MPa | | Plugging breakthrough pressure for 5 mm fracture/MPa | |
| --- | --- | --- | --- | --- | --- | --- |
| | Before aging | After aging | Before aging | After aging | Before aging | After aging |
| Example 1 | 7.36 | 7.20 | 7.22 | 7.15 | 7.16 | 7.09 |
| Example 2 | 7.30 | 7.15 | 7.19 | 7.11 | 7.11 | 7.04 |
| Example 3 | 7.29 | 7.16 | 7.14 | 7.09 | 7.09 | 7.02 |
| Example 4 | 7.27 | 7.12 | 7.13 | 7.08 | 7.05 | 6.98 |
| Example 5 | 7.17 | 7.05 | 7.10 | 7.03 | 7.01 | 6.88 |
| Example 6 | 7.15 | 7.02 | 7.07 | 7.01 | 6.94 | 6.86 |
| Example 7 | 7.12 | 7.01 | 7.03 | 6.98 | 6.92 | 6.84 |
| Example 8 | 7.01 | 6.89 | 6.94 | 6.85 | 6.73 | 6.68 |
| Example 9 | 6.99 | 6.82 | 6.93 | 6.79 | 6.72 | 6.65 |
| Example 10 | 6.97 | 6.80 | 6.89 | 6.77 | 6.68 | 6.62 |
| Example 11 | 6.94 | 6.75 | 6.86 | 6.73 | 6.64 | 6.57 |
| Example 12 | 6.88 | 6.71 | 6.81 | 6.69 | 6.59 | 6.53 |
| Example 13 | 6.58 | 6.44 | 6.48 | 6.40 | 6.41 | 6.32 |
| Example 14 | 6.42 | 6.35 | 6.38 | 6.30 | 6.32 | 6.24 |
| Example 15 | 7.03 | 6.92 | 6.95 | 6.82 | 6.84 | 6.79 |
| Example 16 | 7.13 | 7.02 | 6.96 | 6.86 | 6.87 | 6.80 |
| Example 17 | 7.25 | 7.10 | 7.12 | 7.05 | 7.02 | 6.94 |
| Example 18 | 7.20 | 7.06 | 7.11 | 7.02 | 6.97 | 6.90 |
| Comparative example 1 | 6.04 | 5.96 | 5.98 | 5.90 | 5.92 | 5.79 |
| Comparative example 2 | 6.08 | 5.99 | 6.01 | 5.93 | 5.95 | 5.82 |
| Comparative example 3 | 6.12 | 6.04 | 6.06 | 5.98 | 5.99 | 5.85 |
| Comparative example 4 | 6.15 | 6.06 | 6.09 | 6.01 | 6.02 | 5.88 |
| Comparative example 5 | 6.22 | 6.14 | 6.16 | 6.06 | 6.08 | 5.94 |
| Comparative example 6 | 6.26 | 6.18 | 6.20 | 6.12 | 6.13 | 6.01 |
| Comparative example 7 | 6.18 | 6.10 | 6.11 | 6.03 | 6.04 | 5.90 |

From Table 1, it can be seen that the resin lost circulation materials prepared in the examples of the present invention had an excellent plugging effect on the 3 mm, 4 mm and 5 mm fractures. The results show that the maximum pressure capacity was basically unchanged with the increased fracture width; moreover, the plugging capacity of the lost circulation materials after high temperature aging decreased to a certain extent, but the decreasing range was low, and the the softening point modifier, the softening point temperature range of the resin matrix could be widened, and the resin lost circulation materials could melt and adhere in different temperature ranges to achieve plugging.

Taking example 1 as an example, the plugging pressure vs. time of the resin lost circulation materials was tested at 180° C. (the test method was the same as above). The results are as shown in Table 2.

TABLE 2

Plugging Pressure vs. Time Data of the Resin Lost Circulation Materials Prepared in Example 1 with Time

| Time/h | 0.1 | 0.5 | 1 | 2 | 3 | 4 | 5 |
|---|---|---|---|---|---|---|---|
| Pressure/MPa | 3 | 6 | 7.1 | 7.2 | 7.2 | 7.2 | 5.6 |

From Table 2, it can be seen that in the first 0.5 h, the plugging pressure increased rapidly and almost reached the maximum; as time passed, the plugging pressure increased slowly and reached the maximum at 1 h, and did not change until 4 h later. It indicates that the resin lost circulation materials had an excellent plugging performance at 180° C., and a long plugging time of up to 3-4 h. The plugging effect was excellent.

Test 2. Test on Oil Solubility of the Oil-Soluble Thermosensitive Resin Lost Circulation Materials The oil soluble rate is an important indicator to evaluate the oil solubility of the oil-soluble resin lost circulation materials. The lost circulation materials were dissolved in decolorized and degummed kerosene at a certain temperature, and the oil soluble rate was determined by a filtration method. If the oil soluble rate was low, it indicated that the lost circulation materials were difficult to be dissolved in crude oil, and thus the recovery of permeability was affected, that is, the recovery of well yield was affected. With temperature rise, the oil soluble rate of the lost circulation materials gradually increased.

The determination steps of the oil soluble rate were as follows:

(1) 3.0 g of dried lost circulation material sample (denoted as G) was weighed, added to 100 mL of kerosene under stirring, and dissolved at 80° C., 100° C., 120° C., 140° C., 160° C. and 180° C. for 180 min respectively;

(2) then the mixture was filtrated by dried clean filter paper (denoted as G1) on a glass funnel, the filter paper and residues (denoted as G2) were dried after filtration, and an amount of residues was calculated: A1=G2−G1;

(3) another blank test was made for comparison; namely, 100 mL of kerosene was filtrated on dried clean filter paper (denoted as G3), the filter paper and residues (denoted as G4) were dried after filtration, and an amount of residues of the blank test was calculated: A2=G4−G3; and (4) a dissolution rate of the lost circulation materials in the kerosene was calculated: R=[1−(A1−A2)/G]×100%.

The test results are as shown in Table 3.

TABLE 3

Determination Data of Oil Soluble Rate of the Resin Lost Circulation Materials

| Sample | Temperature/° C. | | | | | |
|---|---|---|---|---|---|---|
| | 80 | 100 | 120 | 140 | 160 | 180 |
| | Oil soluble rate/% | | | | | |
| Example 1 | 81.2 | 88.7 | 92.3 | 94.4 | 95.6 | 96.7 |
| Example 2 | 79.4 | 86.2 | 90.2 | 91.8 | 92.7 | 93.9 |
| Example 3 | 79.3 | 85.6 | 89.8 | 91.2 | 92.2 | 93.5 |
| Example 4 | 72.6 | 79.5 | 82.4 | 85.4 | 87.6 | 89.2 |
| Example 5 | 76.7 | 82.9 | 87.1 | 89.5 | 91.8 | 92.6 |
| Example 6 | 71.6 | 78.2 | 80.6 | 83.8 | 86.9 | 88.9 |
| Example 7 | 71.3 | 77.8 | 80.2 | 83.1 | 86.3 | 88.2 |
| Example 8 | 70.6 | 79.5 | 82.4 | 85.4 | 87.6 | 87.9 |
| Example 9 | 69.6 | 77.6 | 81.3 | 84.9 | 86.8 | 87.1 |
| Example 10 | 69.3 | 76.4 | 80.2 | 83.6 | 85.9 | 86.9 |
| Example 11 | 68.9 | 76.2 | 79.8 | 83.1 | 84.7 | 85.6 |
| Example 12 | 68.5 | 75.8 | 78.6 | 81.9 | 83.2 | 84.6 |
| Example 13 | 67.3 | 74.6 | 76.6 | 78.9 | 82.0 | 84.7 |
| Example 14 | 65.4 | 72.2 | 74.5 | 76.8 | 80.3 | 82.6 |
| Example 15 | 75.6 | 81.8 | 85.7 | 87.6 | 89.5 | 90.0 |
| Example 16 | 75.2 | 81.3 | 85.4 | 87.3 | 89.4 | 89.8 |
| Example 17 | 76.2 | 82.1 | 86.6 | 88.9 | 90.3 | 90.8 |
| Example 18 | 76.9 | 82.7 | 87.3 | 89.6 | 91.2 | 91.7 |
| Comparative example 1 | 62.3 | 66.5 | 72.6 | 77.3 | 80.7 | 81.4 |
| Comparative example 2 | 63.2 | 66.9 | 73.2 | 78.8 | 81.1 | 82.6 |
| Comparative example 3 | 64.2 | 67.5 | 73.9 | 79.4 | 81.5 | 82.6 |
| Comparative example 4 | 64.6 | 67.8 | 74.2 | 79.9 | 81.6 | 82.2 |
| Comparative example 5 | 65.5 | 69.1 | 74.9 | 80.2 | 82.8 | 83.5 |
| Comparative example 6 | 65.7 | 72.1 | 78.9 | 81.7 | 83.2 | 84.9 |
| Comparative example 7 | 65.4 | 68.9 | 74.6 | 79.3 | 82.4 | 83.7 |

From Table 3, it can be seen that at the same temperature, the oil-soluble thermosensitive resin lost circulation materials prepared in the examples of the present invention had an excellent oil soluble rate; with temperature rise, the oil soluble rate of the same lost circulation materials also increased, and especially the oil-soluble thermosensitive resin lost circulation materials prepared in example 1 had the maximum oil soluble rate of 96.7%. At the same time, because the synthetic lost circulation materials were resin lost circulation materials and insoluble in water, the resin lost circulation materials had excellent selective plugging performance for water.

In combination with example 1 and comparative examples 1-7, it can be seen that the modified asphalt had the greatest impact on the oil soluble rate of the lost circulation materials, followed by the viscosity modifier and the softening point modifier. When the parts by weight of the modified asphalt were optimal, the resin lost circulation materials had the highest oil soluble rate, and the oil soluble rate increased with the increased modified asphalt content within a certain range. Because the modified asphalt has a molecular structure close to oil, it can enhance the oil solubility of the resin matrix; and the ratio of the modified asphalt to the resin matrix was optimized, so that the resin lost circulation materials could be fully dissolved in crude oil.

Test 3. Determination on Softening Point of the Oil-Soluble Thermosensitive Resin Lost Circulation Materials The temperature resistance of the lost circulation materials was evaluated by determining the softening point of the oil-soluble thermosensitive resin lost circulation materials. The method was as follows:

(1) 200 mL of glycerol was poured into a 400 mL beaker, 10 g of oil-soluble thermosensitive resin lost circulation material was added to a 100 mL beaker, and the 100 ml beaker was placed in the 400 ml beaker containing the glycerol;

(2) the 400 mL beaker was placed on an electric furnace and slowly heated, whether the lost circulation materials began to soften, dilute and discolor was observed as the temperature rose gradually, and the temperature (T1) at this time, i.e., a softening point at the temperature rise, was recorded; and (3) after the above-mentioned phenomenon occurred, the temperature was further increased; when the oil-soluble resin lost circulation materials completely melted and flowed rapidly, the temperature (T2) at this time was recorded.

Taking example 1 as an example, the change state of the oil-soluble resin lost circulation material in the determination process is as shown in Table 4.

TABLE 4

Change State of the Resin lost circulation material Prepared in Example 1

| Temperature/° C. | State of resin lost circulation material |
|---|---|
| 80 | Unchanged |
| 90 | Unchanged |
| 100 | The powder began to aggregate |
| 120 | Formed clumps and began to melt |
| 180 | Completely melted |
| 200 | Able to flow |

From Table 4, it can be seen that the oil-soluble resin began to aggregate at 100° C., formed clumps and began to melt at 120° C., completely melted at 160° C., and could flow at 180° C. Therefore, the softening point was 100° C. The softening points of the resin lost circulation materials prepared in examples 1-18 and comparative examples 1-7 were tested as described above. The results are as shown in Table 5.

TABLE 5

Softening Point Temperature and Complete Melting Temperature of the Resin lost circulation materials Prepared in Examples 1-18 and Comparative Examples 1-7

| Sample | Softening point temperature/° C. | Complete melting temperature/° C. |
|---|---|---|
| Example 1 | 100 | 180 |
| Example 2 | 115 | 170 |
| Example 3 | 110 | 170 |
| Example 4 | 113 | 168 |
| Example 5 | 117 | 165 |
| Example 6 | 125 | 162 |
| Example 7 | 120 | 162 |
| Example 8 | 125 | 160 |
| Example 9 | 127 | 155 |
| Example 10 | 128 | 155 |
| Example 11 | 127 | 160 |
| Example 12 | 124 | 160 |
| Example 13 | 118 | 165 |
| Example 14 | 112 | 172 |
| Example 15 | 115 | 165 |
| Example 16 | 112 | 174 |
| Example 17 | 114 | 166 |
| Example 18 | 112 | 168 |
| Comparative example 1 | 128 | 162 |
| Comparative example 2 | 128 | 161 |
| Comparative example 3 | 120 | 158 |
| Comparative example 4 | 125 | 160 |
| Comparative example 5 | 134 | 163 |
| Comparative example 6 | 136 | 164 |
| Comparative example 7 | 133 | 163 |

From Table 5, it can be seen that the softening point temperature range in example 1 was the largest; the parts of the modified asphalt in comparative examples 1 and 2 were beyond the range of the present invention, and the parts of the softening point modifier in comparative examples 5, 6 and 7 were beyond the optimal range, so their softening point temperature ranges were low. Therefore, it can be concluded that the softening point modifier has the greatest impact on the softening point temperature of the resin lost circulation materials, followed by the modified asphalt. The modified asphalt can increase the softening point temperature of the resin lost circulation materials, while the softening point modifier can widen the softening point temperature range of the resin lost circulation materials, so that the resin lost circulation materials can melt and adhere in different temperature ranges and are suitable for formations with different temperatures.

What is claimed is:

1. An oil-soluble thermosensitive resin lost circulation material for protecting a reservoir, comprising the following raw materials in parts by weight: 40-60 parts of a resin matrix, 15-40 parts of a modified asphalt, 5-12 parts of a viscosity modifier, 2-5 parts of a cross-linking agent, 6-15 parts of a softening point modifier, and 1-3 parts of a dispersant; wherein the resin matrix is a combination of two or three of oil-soluble phenolic resin, rosin resin and acrylic resin; the viscosity modifier is a combination of N,N'-ethylene bisstearamide and oxidized polyethylene wax; the softening point modifier is a combination of dihydrogenated rosin and tetrahydrogenated rosin; the cross-linking agent is one or a combination of two or three of epoxy resin, terephthalyl alcohol and C9 petroleum resin; the dispersant is one or a combination of two or three of sodium dodecyl sulfonate, 1-Octadecanol and tris-ethylhexyl phosphate;

wherein the modified asphalt is prepared by the following steps:
 (i) adding asphalt to a reactor, and setting a reactor temperature to 80-120° C.;
 (ii) adding C9 petroleum resin and terephthalyl alcohol to the reactor, introducing nitrogen at a normal pressure, and stirring the mixture for reaction; and
 (iii) then further heating the mixture to 100-140° C., and stirring the mixture for reaction; upon completion of the reaction, drying, crushing and screening to obtain the modified asphalt.

2. The oil-soluble thermosensitive resin lost circulation material according to claim 1, wherein the oil-soluble thermosensitive resin lost circulation material comprises the following raw materials in parts by weight: 44-56 parts of the resin matrix, 25-35 parts of the modified asphalt, 7-10 parts of the viscosity modifier, 2-4 parts of the cross-linking agent, 9-12 parts of the softening point modifier, and 1-2 parts of the dispersant.

3. The oil-soluble thermosensitive resin lost circulation material according to claim 1, wherein the resin matrix is a combination of oil-soluble phenolic resin and rosin resin, wherein a mass ratio of the oil-soluble phenolic resin to the rosin resin is 1:2; a mass ratio of the N,N'-ethylene bisstearamide to the oxidized polyethylene wax in the viscosity modifier is 1:2; and a mass ratio of the dihydrogenated rosin to the tetrahydrogenated rosin in the softening point modifier is 1:1.

4. The oil-soluble thermosensitive resin lost circulation material according to claim 1, wherein
in the step (i), the reactor temperature is set to 90-100° C.;
a softening point of the asphalt is 50-60° C., and a density of the asphalt is 1.15-1.25 g/cm$^3$;

in the step (ii), a mass ratio of the C9 petroleum resin to the terephthalyl alcohol is 1:(1-2); a mass ratio of the C9 petroleum resin to the asphalt is 1:(2-4); a stirring speed is 100-300 rpm; and a reaction time is 2-3 hours; and in the step (iii), the heating is heating to 110-120° C.; a stirring speed is 100-200 rpm; a reaction time is 1-2 hours; and the drying is drying at 30-40° C. for 0.5-2 hours.

5. A method for preparing the oil-soluble thermosensitive resin lost circulation material for protecting the reservoir of claim 1, comprising the following steps:

(1) heating the resin matrix until the resin matrix is melted completely, and adding the dispersant under stirring to obtain a mixture I;

(2) adding the viscosity modifier to the mixture I obtained in the step (1), controlling a mixing temperature at 130-150° C., and stirring the mixture evenly; adding the cross-linking agent under stirring for reaction; then adding the softening point modifier, and stirring the mixture evenly to obtain a mixture II; then cooling and crushing the mixture II to obtain resin particles; and (3) grinding, mixing and screening the modified asphalt and the resin particles to obtain the oil-soluble thermosensitive resin lost circulation material with various of particle sizes.

6. The method for preparing the oil-soluble thermosensitive resin lost circulation material for protecting the reservoir of claim 5, wherein:

in step (1), the heating is heating to 110-120° C.;

in the step (2), a temperature of the mixing is 140-150° C.; and a speed of the stirring is 200-500 rpm;

a reaction time is 30-60 min after the cross-linking agent is added;

the cooling is cooling to a room temperature; the crushing is performed by a high-speed universal grinder at a speed of 15,000-24,000 rpm; and a crushing time is 2-10 min; and in the step (3), the grinding is performed by a colloid mill, and a rotation speed of a colloid mill rotor is 5,000-10,000 rpm.

7. A process for protecting reservoirs comprising a step of utilizing the oil-soluble thermosensitive resin lost circulation material of claim 1 in an oil and gas drilling.

\* \* \* \* \*